United States Patent
Gulati et al.

(10) Patent No.: US 11,405,893 B2
(45) Date of Patent: Aug. 2, 2022

(54) RECEIVER-BASED RESOURCE RESERVATION

(71) Applicant: QUALCOMM Incorporated, San Diego, CA (US)

(72) Inventors: Kapil Gulati, Hillsborough, NJ (US); Tien Viet Nguyen, Bridgewater, NJ (US); Arjun Bharadwaj, Cupertino, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 16/737,643

(22) Filed: Jan. 8, 2020

(65) Prior Publication Data

US 2020/0229170 A1    Jul. 16, 2020

Related U.S. Application Data

(60) Provisional application No. 62/790,792, filed on Jan. 10, 2019.

(51) Int. Cl.
*H04W 72/04* (2009.01)
*H04W 72/10* (2009.01)
*H04L 1/18* (2006.01)

(52) U.S. Cl.
CPC ....... *H04W 72/0406* (2013.01); *H04L 1/1812* (2013.01); *H04W 72/10* (2013.01)

(58) Field of Classification Search
CPC .................................................. H04W 72/0406
See application file for complete search history.

(56) References Cited

U.S. PATENT DOCUMENTS

| | | | |
|---|---|---|---|
| 2017/0150527 A1 | 5/2017 | Duval et al. | |
| 2018/0146453 A1 | 5/2018 | Hu et al. | |
| 2020/0367204 A1* | 11/2020 | Li | H04W 72/0453 |

FOREIGN PATENT DOCUMENTS

| | | | | |
|---|---|---|---|---|
| WO | WO-2017171895 A1 * | 10/2017 | ........... | H04L 1/0001 |
| WO | WO-2018062969 A1 * | 4/2018 | ........... | H04W 52/146 |

OTHER PUBLICATIONS

CAICT: "Discussions on Transmission Collisions in the Sidelink Resource Allocation", 3GPP Draft; R1-1811521, 3rd Generation Partnership Project (3GPP), Mobile Competence Centre; 650, Route Des Lucioles; F-06921 Sophia-Antipolis Cedex; France, vol. RAN WG1. No. Chengdu, China; Oct. 8, 2018-Oct. 12, 2018 Sep. 28, 2018 (Sep. 28, 2018), XP051518923, 4 pages, Retrieved from the Internet: URL: http://www.3gpp.org/ftp/tsg%5Fran/WG1%5jFRL1/TSGR1%5F94b/Docs/R1%2D1811521%2Ezip [retrieved on Sep. 28, 2018].

(Continued)

Primary Examiner — Hoon J Chung
(74) Attorney, Agent, or Firm — Harrity & Harrity, LLP (57) ABSTRACT

Various aspects of the present disclosure generally relate to wireless communication. In some aspects, a user equipment (UE) may receive, from a first transmitting UE, a first transmission on a first resource, wherein the first transmission includes information associated with reserving a second resource for a second transmission by the first transmitting UE. The UE may transmit, for reception by one or more second transmitting UEs and before an occurrence of the second resource, a message associated with indicating that the second resource is reserved for the second transmission by the first transmitting UE. Numerous other aspects are provided.

34 Claims, 6 Drawing Sheets

(56) References Cited

OTHER PUBLICATIONS

Interdigital Inc: "Resource Allocation for NR V2X", 3GPP Draft; R1-1813164 (R16 V2X WI AI72414 Resource Allocation), 3rd Generation Partnership Project (3GPP), Mobile Competence Centre; 650, Route Des Lucioles; F-06921 Sophia-Antipolis Cedex; France, vol. RAN WG1. No Spokane, USA; Nov. 12, 2018-Nov. 16, 2018 Nov. 11, 2018 (Nov. 11, 2018), XP051555157, 9 pages, Retrieved from the Internet: URL: http://www.3gpp.org/ftp/Meetings%5F3GPP%5FSYNC/RAN1/Docs/R1%2D1813164%2Ezip [retrieved on Nov. 11, 2018].
International Search Report and Written Opinion—PCT/US2020/012886—ISA/EPO—dated Apr. 30, 2020.

* cited by examiner

RECEIVER-BASED RESOURCE RESERVATION

CROSS-REFERENCE TO RELATED APPLICATION

This application claims priority to U.S. Provisional Patent Application No. 62/790,792, filed on Jan. 10, 2019, entitled "RECEIVER-BASED RESOURCE RESERVATION," which is hereby expressly incorporated by reference herein.

FIELD OF THE DISCLOSURE

Aspects of the present disclosure generally relate to wireless communication, and to techniques and apparatuses for receiver-based resource reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a first transmitting UE, a first transmission on a first resource, wherein the first transmission includes information associated with reserving a second resource for a second transmission by the first transmitting UE. The method may include transmitting, for reception by one or more second transmitting UEs and before an occurrence of the second resource, a message associated with indicating that the second resource is reserved for the second transmission by the first transmitting UE.

In some aspects, a UE for wireless communication may include memory and one or more processors operatively coupled to the memory. The memory and the one or more processors may be configured to receive, from a first transmitting UE, a first transmission on a first resource, wherein the first transmission includes information associated with reserving a second resource for a second transmission by the first transmitting UE. The memory and the one or more processors may be configured to transmit, for reception by one or more second transmitting UEs and before an occurrence of the second resource, a message associated with indicating that the second resource is reserved for the second transmission by the first transmitting UE.

In some aspects, a non-transitory computer-readable medium may store one or more instructions for wireless communication. The one or more instructions, when executed by one or more processors of a UE, may cause the one or more processors to receive, from a first transmitting UE, a first transmission on a first resource, wherein the first transmission includes information associated with reserving a second resource for a second transmission by the first transmitting UE. The one or more instructions, when executed by the one or more processors of the UE, may cause the one or more processors to transmit, for reception by one or more second transmitting UEs and before an occurrence of the second resource, a message associated with indicating that the second resource is reserved for the second transmission by the first transmitting UE.

In some aspects, an apparatus for wireless communication may include means for receiving, from a first transmitting UE, a first transmission on a first resource, wherein the first transmission includes information associated with reserving a second resource for a second transmission by the first transmitting UE. The apparatus may include means for transmitting, for reception by one or more second transmitting UEs and before an occurrence of the second resource, a message associated with indicating that the second resource is reserved for the second transmission by the first transmitting UE.

In some aspects, a method of wireless communication, performed by a user equipment (UE), may include receiving, from a first UE, a message associated with indicating that a particular resource is reserved for a particular transmission by a second UE. The method may include selectively forgoing, based at least in part on a priority of the particular transmission, use of the particular resource that is reserved for the particular transmission by the second UE and to the first UE.

In some aspects, a UE for wireless communication may include memory and one or more processors operatively coupled to the memory. The memory and the one or more processors may be configured to receive, from a first UE, a message associated with indicating that a particular resource is reserved for a particular transmission by a second UE. The memory and the one or more processors may be configured to selectively forgo, based at least in part on a priority of the particular transmission, use of the particular resource that is reserved for the particular transmission by the second UE and to the first UE.

In some aspects, a non-transitory computer-readable medium may store one or more instructions for wireless communication. The one or more instructions, when executed by one or more processors of a UE, may cause the one or more processors to receive, from a first UE, a message associated with indicating that a particular resource is reserved for a particular transmission by a second UE. The one or more instructions, when executed by the one or more processors of the UE, may cause the one or more processors to selectively forgo, based at least in part on a priority of the particular transmission, use of the particular resource that is reserved for the particular transmission by the second UE and to the first UE.

In some aspects, an apparatus for wireless communication may include means for receiving, from a first UE, a message associated with indicating that a particular resource is reserved for a particular transmission by a second UE. The apparatus may include means for selectively forgoing, based at least in part on a priority of the particular transmission, use of the particular resource that is reserved for the particular transmission by the second UE and to the first UE.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
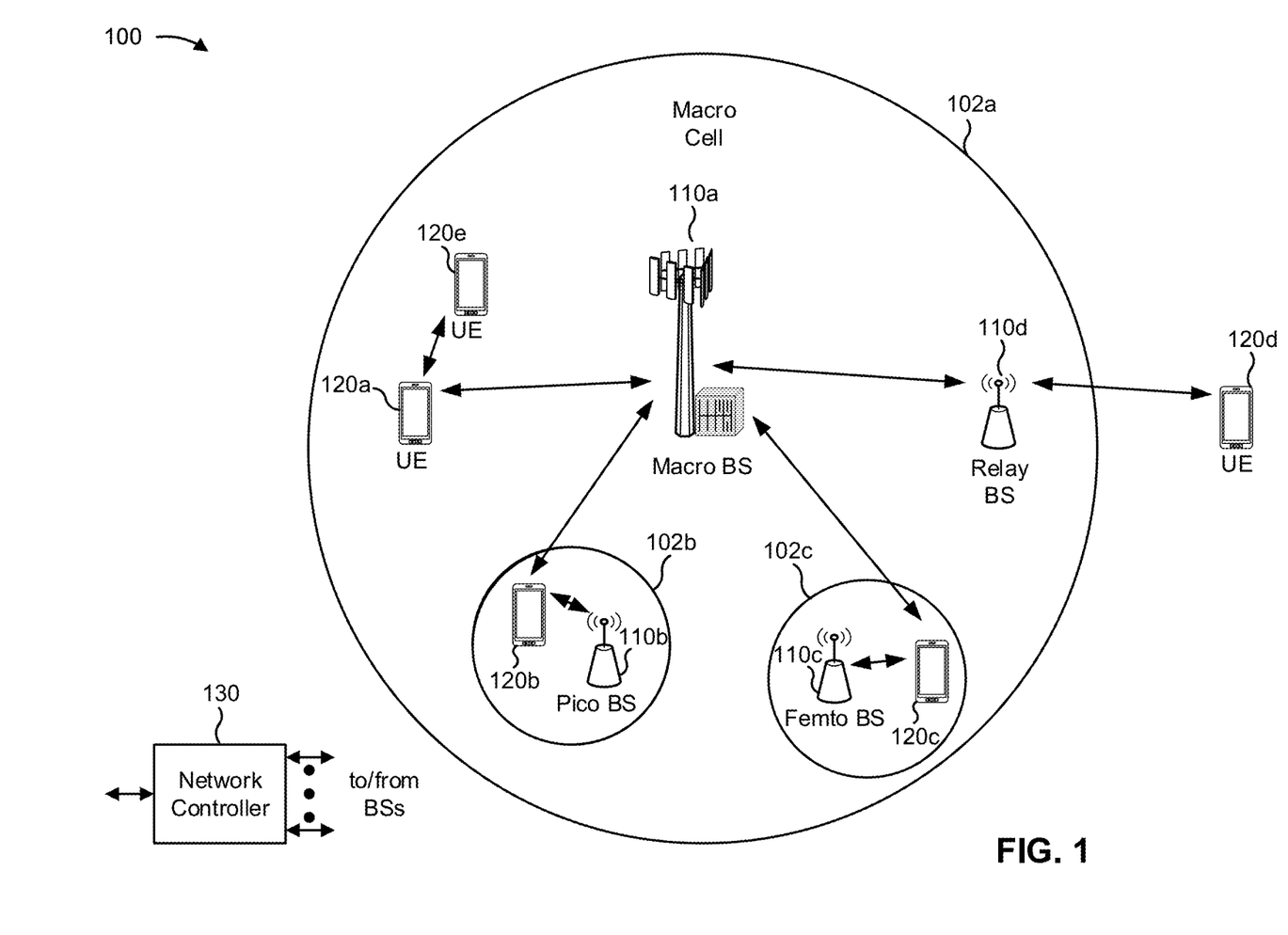
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

UEs 120 may communicate with other UEs 120 using sidelink communications. In such a scenario, a first UE 120 may attempt to reserve resources for communication with a second UE 120. One or more third UEs 120 may detect a resource reservation indication from the first UE 120, and may determine not to transmit using resources reserved by the first UE 120. However, in some cases, the one or more third UEs 120 may not be in a communication range of first UE 120, but may be within a communication range of second UE 120. As a result, the one or more third UEs 120 may not detect the resource reservation indication from first UE 120, and may transmit and cause interference for second UE 120. Some aspects described herein enable receiver-based resource reservation to enable the second UE 120 to alert the one or more third UEs 120 that the first UE 120 has reserved resources. In this way, the second UE 120 reduces a likelihood of interference and improves network performance.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
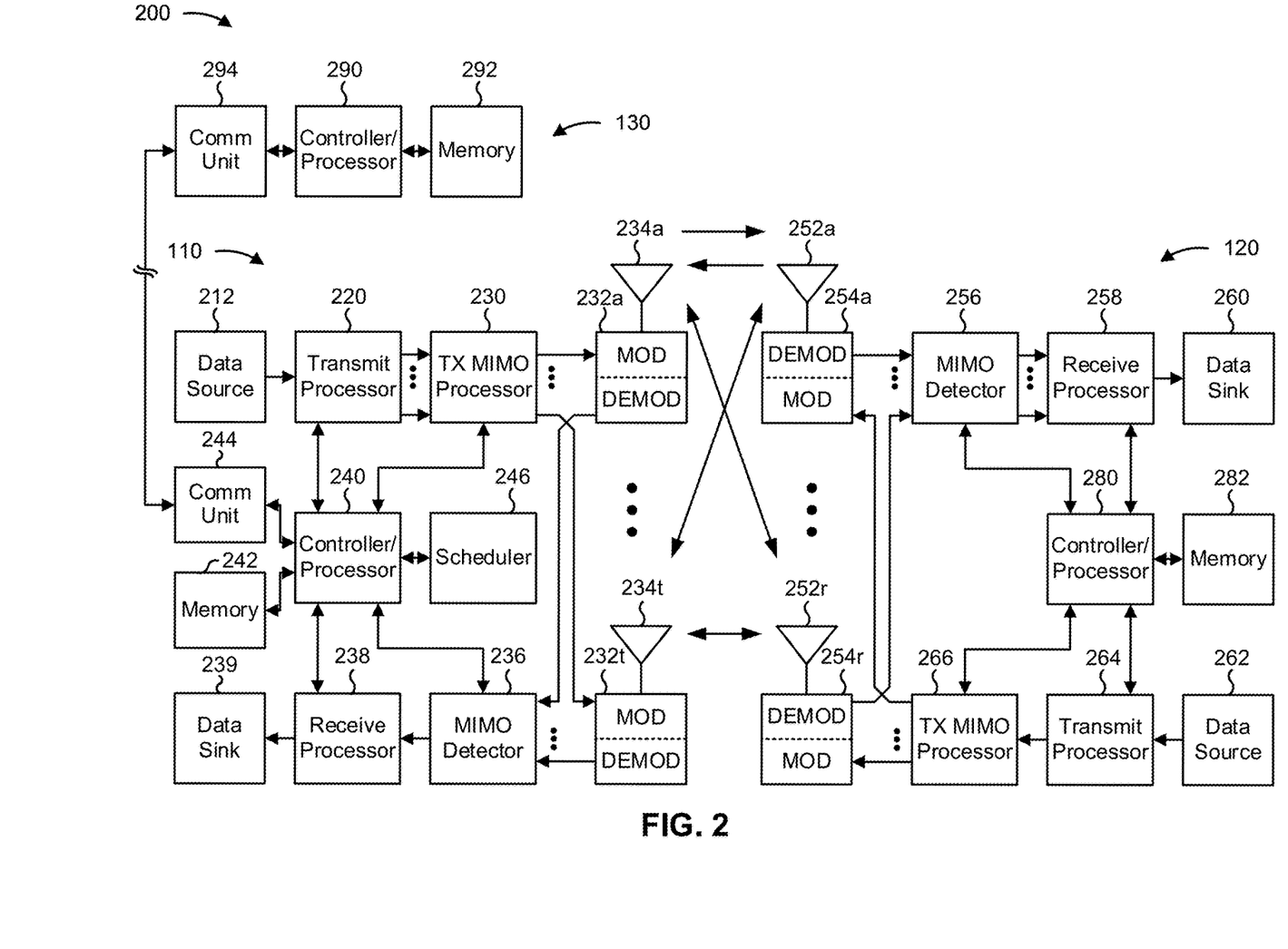
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with receiver-based resource reservation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a first transmitting UE, a first transmission on a first resource, wherein the first transmission includes information associated with reserving a second resource for a second transmission by the first transmitting UE, means for transmitting, for reception by one or more second transmitting UEs and before an occurrence of the second resource, a message associated with indicating that the second resource is reserved for the second transmission by the first transmitting UE, and/or the like. In some aspects, UE 120 may include means for receiving, from a first UE, a message associated with indicating that a particular resource is reserved for a particular transmission by a second UE, means for selectively forgoing, based at least in part on a priority of the particular transmission, use of the particular resource that is reserved for the particular transmission by the second UE and to the first UE, and/or the like. In some aspects, such means may include one or more components of UE 120 described in connection with FIG. 2.

As indicated above, FIG. 2 is provided merely as an example. Other examples may differ from what is described with regard to FIG. 2.

In some communications systems, such as 5G or NR, UEs may communicate using a decentralized channel access mechanism. For example, a first UE may use a random resource selection procedure to attempt to communicate without interfering with a second UE. Similarly, UEs may use a listen-before talk based resource selection procedure, a request-response (REQ-RESP) based resource selection procedure, and/or the like. A collision probability (e.g., a spatial reuse of resources by a plurality of UEs) may be based at least in part on which channel access mechanism is used. For example, random resource selection may be associated with a higher probability of reuse of time and frequency resources than, for example, listen-before-talk or REQ-RESP based resource selection procedures.

As a result, implementing, for example, a REQ-RESP based resource selection procedure may result in improved network performance relative to random resource selection. Further, REQ-RESP based resource selection may enable priority handling. For example, when a high priority UE and a low priority UE both attempt to reserve a common resource, the high priority UE may successfully reserve the common resource and the low priority UE may yield use of the common resource based at least in part on the low priority UE determining that the high priority UE is attempting to reserve the common resource.

However, in some cases, there may not be an explicit physical channel for transmission of resource reservation information. In such a case, resource reservation information may be included in (i.e., piggy-backed onto) control transmissions and data transmissions on a physical channel. In this case, a first UE may transmit a first transmission to a second UE on first resources, and may include reservation information in the first transmission to reserve second resources for a second transmission. However, in some cases, one or more third UEs, that are within a range to cause interference with the first UE at the second UE, may not be within a range to receive the reservation information from the first UE. For example, when the second UE is disposed between the first UE and the one or more third UEs, both the first UE and the one or more third UEs may be capable of transmitting to the second UE, without the first UE being able to communicate directly with the one or more third UEs. In this case, the first UE may attempt to reserve a resource, and the one or more third UEs may not detect that the first UE is attempting to reserve the resource. As a result, the first UE may transmit using the resource and one of the one or more third UEs may also transmit using the resource, resulting in interference at the second UE.

Some aspects described herein enable receiver-based resource reservation. For example, a first UE may transmit reservation information to a second UE, and the second UE may transmit a message (e.g., a feedback message, a sidelink communication message, and/or the like) that includes the reservation information to one or more third UEs regardless of whether the one or more third UEs are within a range of the first UE. In this case, the one or more third UEs may selectively forgo transmitting (e.g., refrain from transmitting or reduce a power for transmitting) using the second resources based at least in part on receiving the message. In this case, a likelihood of interference is reduced relative to a scenario where the first UE transmits the reservation information and a third UE does not receive the reservation as the third UE is out of range of the first UE, but where the second UE is within range of both the first UE and the third UE. In this way, the second UE enables receiver-side protection against interference when using a REQ-RESP based resource selection procedure (i.e., reservation mechanism). Moreover, the second UE enables request to send/clear to send (RTS/CTS) behavior with resource reservation.

Figure 3A:
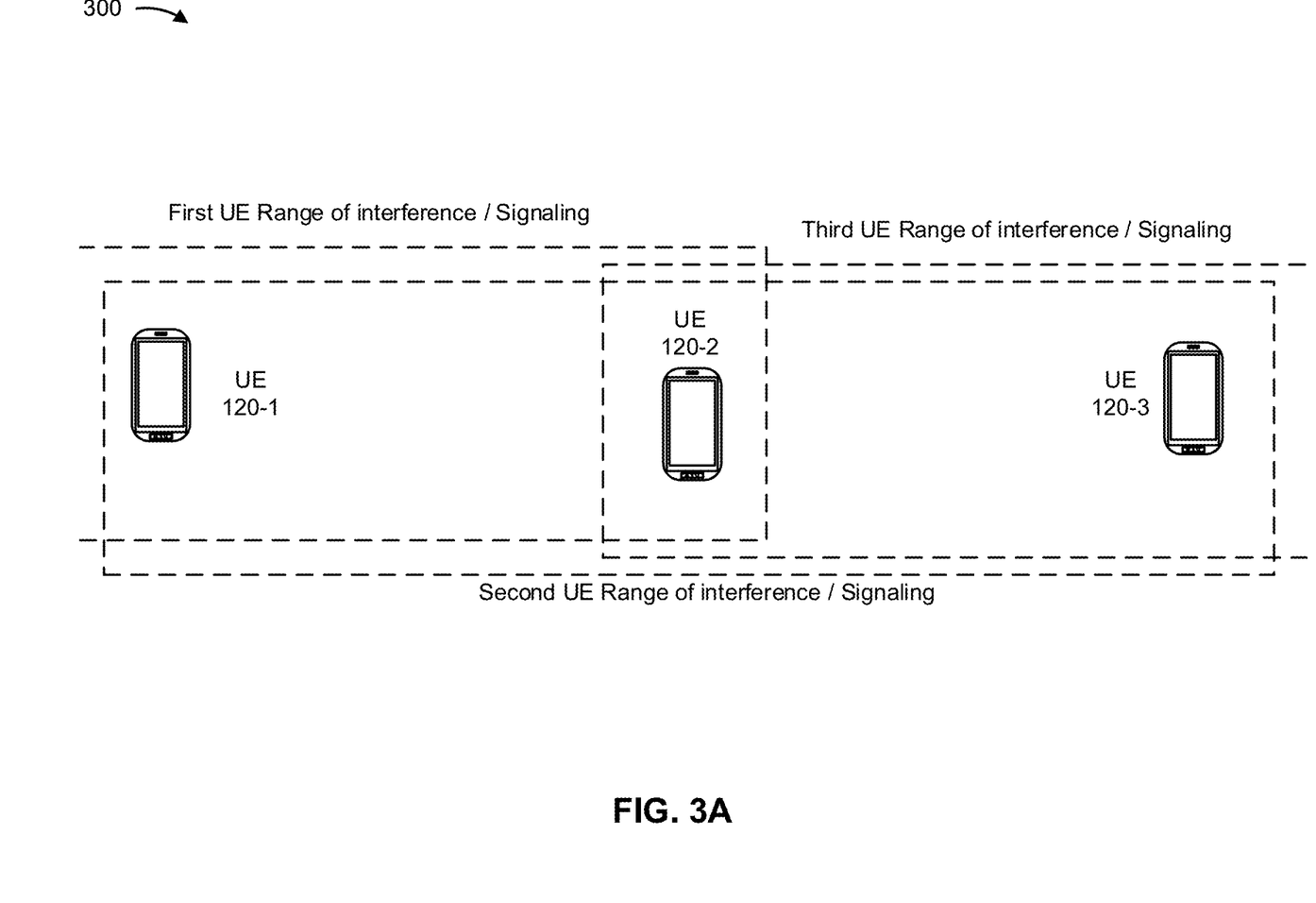
FIGS. 3A and 3B are diagrams illustrating an example of receiver-based resource reservation, in accordance with various aspects of the present disclosure.
Figure 3B:
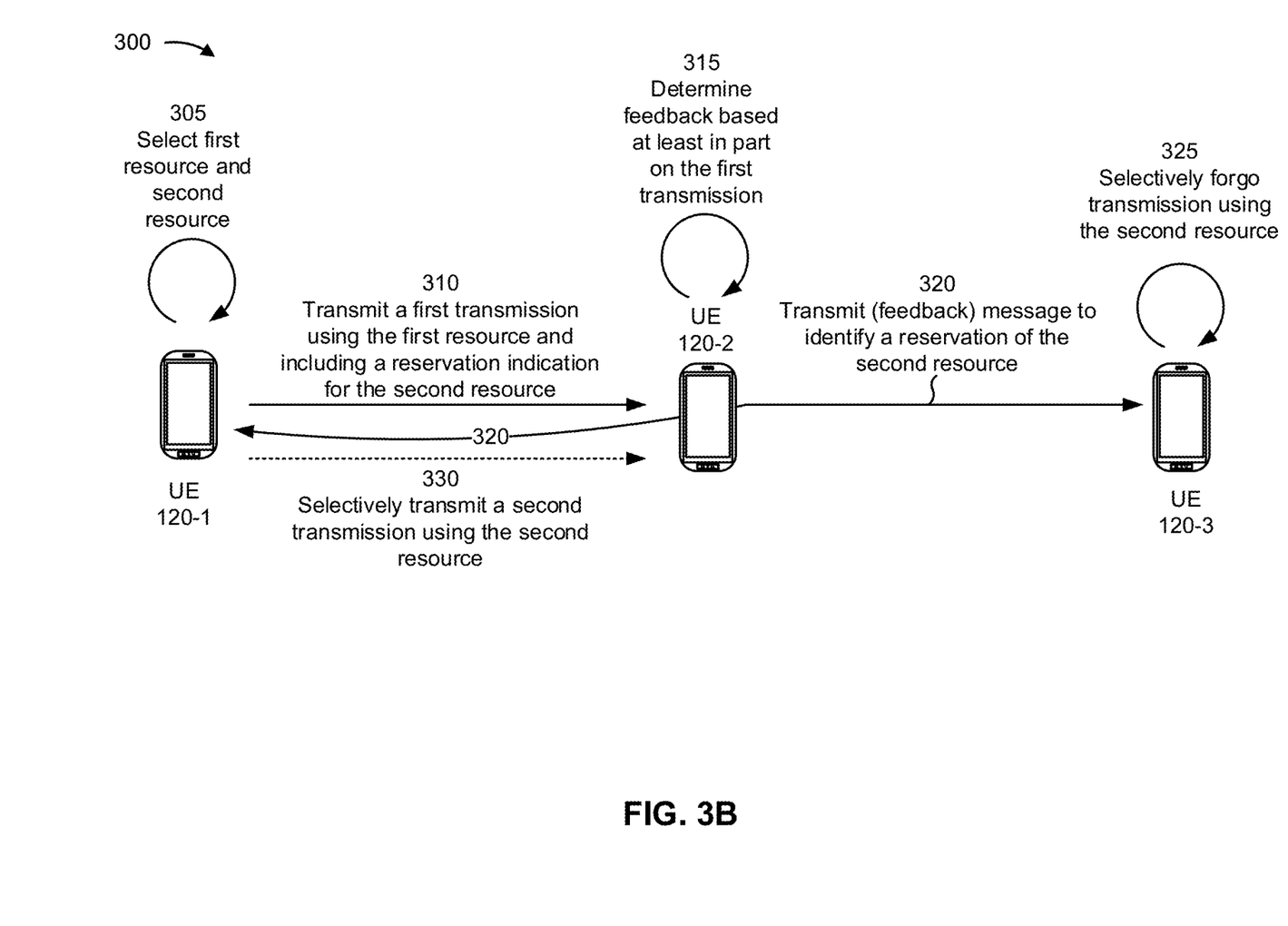

FIGS. 3A and 3B are diagrams illustrating an example 300 of receiver-based resource reservation, in accordance with various aspects of the present disclosure. As shown in FIG. 3A, example 300 includes a set of UEs 120 in sidelink communication. For example, the set of UEs 120 may include a first UE 120-1, a second UE 120-2, and a third UE 120-3.

As further shown in FIG. 3A, first UE 120-1 may be associated with a particular transmission range. For example, based at least in part on a transmit power of first UE 120-1, a modulation and coding scheme, a local terrain, and/or the like, first UE 120-1 may be associated with a particular transmission range. In this case, the transmission range of first UE 120-1 may include second UE 120-2, but may not include third UE 120-3. Similarly, second UE 120-2 may be associated with a transmission range that includes first UE 120-1 and third UE 120-3. Similarly, third UE 120-3 may be associated with a transmission range that includes second UE 120-2 and does not include first UE 120-1. As a result, a direct resource reservation message from first UE 120-1 may be received by second UE 120-2 and may not be received by third UE 120-3. Nevertheless, transmissions of third UE 120-3 may interfere with transmissions of first UE 120-1 at second UE 120-2.

As shown in FIG. 3B, and by reference number 305, first UE 120-1 may select a first resource for a first transmission and a second resource for a second transmission. For example, first UE 120-1 may select the first resource and the second resource for transmission using controller/processor 280, transmit processor 264, TX MIMO processor 266, MOD 254, antenna 252, and/or the like). In some aspects, first UE 120-1 may determine to transmit control information and payload information (i.e., a control and/or data transmission) to second UE 120-2, and may select the first resource for the control information and the payload information transmission. In some aspects, first UE 120-1 may select the second resource for a potential retransmission of the first transmission (e.g., based at least in part on second UE 120-2 indicating an unsuccessful reception of the first transmission). In some aspects, first UE 120-1 may transmit using the first resource without performing a resource reservation.

As further shown in FIG. 3B, and by reference number 310, first UE 120-1 may transmit, to second UE 120-2, the first transmission using the first resource. For example, first UE 120-1 may transmit the first transmission using controller/processor 280, transmit processor 264, TX MIMO processor 266, MOD 254, antenna 252, and/or the like and second UE 120-2 may receive the first transmission using antenna 252, DEMOD 254, MIMO detector 256, receive processor 258, controller/processor 280, and/or the like. In some aspects, first UE 120-1 may transmit control information, payload data, and reservation information. In this case, the reservation information may include an indication of a reservation of the second resource for the second transmission. In some aspects, first UE 120-1 may transmit the reservation information in a portion of the first resource used for transmitting control information.

As further shown in FIG. 3B, and by reference number 315, second UE 120-2 may determine feedback information based at least in part on the first transmission. For example, second UE 120-2 may determine the feedback information using controller/processor 280). In some aspects, second UE 120-2 may generate a message (e.g., a feedback message generated using controller/processor 280, transmit processor 264, TX MIMO processor 266, MOD 254, antenna 252, and/or the like) identifying the reservation of the second resource by first UE 120-1 for the second transmission. In this case, second UE 120-2 may explicitly indicate the second resource (e.g., by providing an identifier of the resource) or implicitly indicate the second resource (e.g., by providing information from which third UE 120-3 may derive the second resource). In some aspects, the feedback information may be an acknowledgement (ACK) message that includes information identifying the reservation of the second resource. For example, second UE 120-2 may determine (e.g., using controller/processor 280) whether second UE 120-2 is able to properly decode the first transmission, and may transmit an ACK message to indicate that second UE 120-2 is able to properly decode the first transmission. In some aspects, the feedback information may be a negative acknowledgement (NACK) message that includes information identifying the reservation of the second resource. For example, second UE 120-2 may determine whether second UE 120-2 is able to properly decode the first transmission, and may transmit a NACK message to indicate that second UE 120-2 is not able to properly decode the first transmission. In some aspects, second UE 120-2 may determine a transmit power for a message (e.g., the feedback message) conveying the feedback information. For example, second UE 120-2 may determine (e.g., using controller/processor 280, transmit processor 264, TX MIMO processor 266, MOD 254, antenna 252, and/or the like) the transmit power based at least in part on a received reference signal received power (RSRP) of the transmission from first UE 120-1. Additionally, or alternatively, UE 120-2 may determine the transmit power based at least in part on a modulation and coding scheme of data of the first transmission from first UE 120-1.

As further shown in FIG. 3B, and by reference number 320, second UE 120-2 may transmit a message (e.g., a feedback message) to identify the reservation of the second resource by first UE 120-1 for the second transmission. For example, second UE 120-2 may transmit the message controller/processor 280, transmit processor 264, TX MIMO processor 266, MOD 254, antenna 252, and/or the like and one or more other UEs (e.g., a third UE 120-3 and/or the like) may attempt to receive the message using respective antennas 252, DEMODs 254, MIMO detectors 256, receive processors 258, controller/processors 280, and/or the like. In some aspects, second UE 120-2 may transmit the message to third UE 120-3 and/or one or more other UEs (regardless of whether the third UE 120-3 is within range of the first UE 120-1). Additionally, or alternatively, second UE 120-2 may transmit the message to first UE 120-1 to provide an acknowledgement (ACK) message (e.g., that second UE 120-2 successfully received the first transmission), to provide a negative acknowledgement (NACK) message (e.g., that second UE 120-2 did not successfully receive the first transmission), and/or the like.

In some aspects, second UE 120-2 may transmit the message to any UE within range of second UE 120-2 to ensure that any UE within range of second UE 120-2 is notified of the resource reservation by first UE 120-1. For example, second UE 120-2 may broadcast the message to ensure that first UE 120-1 receives the message (e.g., an ACK or NACK) and that any other UE that is listening for feedback messages identifying resource reservations may also receive the message. In some aspects, UE 120-2 may multicast the message. In this way, second UE 120-2 ensures that third UE 120-3 receives an indication of the reservation of the second resource even when third UE 120-3 does not detect the first transmission using the first resource from first UE 120-1 (and the reservation information included therewith).

As further shown in FIG. 3B, and by reference number 325, third UE 120-3 may selectively forgo transmission using the second resource based at least in part on receiving the message. For example, third UE 120-3 may determine to forgo transmission using controller/processor 280. In some aspects, third UE 120-3 may yield during the second resource by not transmitting using the second resource, by reducing a transmit power of a transmission using the second resource, and/or the like. In this case, third UE 120-3 may determine the transmit power based at least in part on a received RSRP, a transmit power indication from second UE 120-2, and/or the like.

In some aspects, third UE 120-3 may determine a third resource for a third transmission using controller/processor 280. For example, third UE 120-3 may exclude resources reserved by, for example, first UE 120-1 (e.g., the second resource) based at least in part on receiving the message from second UE 120-2. In some aspects, third UE 120-3 may not forgo transmission using the second resource. For example, when third UE 120-3 is to transmit a higher priority transmission than is indicated for first UE 120-1 in the message, third UE 120-3 may transmit the higher priority transmission using the second resource. In this case, third UE 120-3 may transmit (e.g., using controller/processor 280, transmit processor 264, TX MIMO processor 266, MOD 254, antenna 252, and/or the like) reservation information indicating the higher priority transmission, and, for example, second UE 120-2 may transmit a message (e.g., the feedback message) to first UE 120-1 indicating the higher priority transmission to cause first UE 120-1 to yield to third UE 120-3. In some aspects, third UE 120-3 may yield to first UE 120-1 based at least in part on a partial resource reservation conflict. For example, based at least in part on determining a conflict of one or more subcarriers, a time domain, and/or the like, third UE 120-3 may forgo transmission or reduce a transmit power to avoid causing interference.

As further shown in FIG. 3B, and by reference number 330, first UE 120-1 may selectively transmit the second transmission using the second resource. For example, first UE 120-1 may transmit the second transmission (e.g., using controller/processor 280, transmit processor 264, TX MIMO processor 266, MOD 254, antenna 252, and/or the like), which may be a retransmission of the first transmission (e.g., based at least in part on receiving a negative acknowledgement message from second UE 120-2) or may be a third transmission that is not a retransmission of the first transmission, using the second resource. Additionally, or alternatively, based at least in part on third UE 120-3 having a higher priority transmission than the second transmission, first UE 120-1 may not transmit (e.g., based at least in part on a determination by controller/processor 280) using the second resource (and third UE 120-3 may transmit using the second resource).

As indicated above, FIGS. 3A and 3B are provided examples. Other examples may differ from what is described with respect to FIGS. 3A and 3B.

Figure 4:
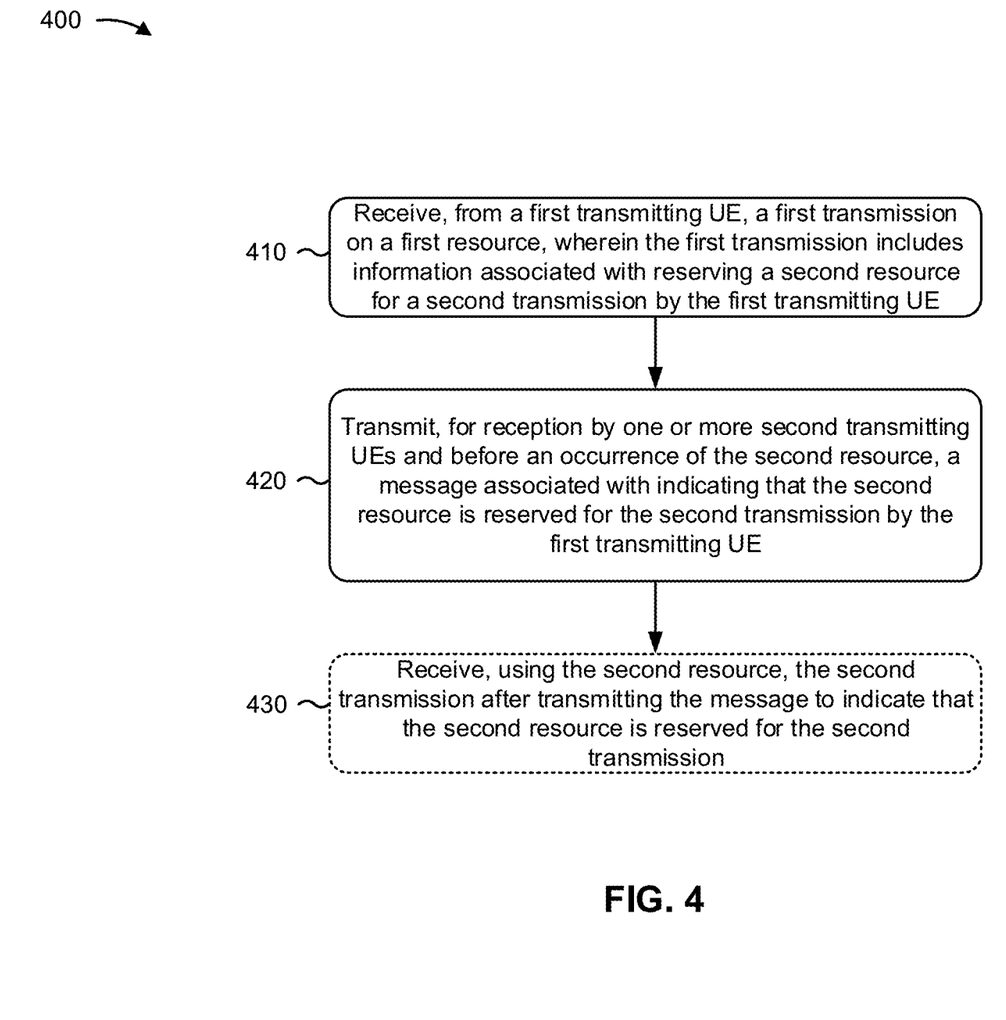
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs receiver-based resource reservation.

As shown in FIG. 4, in some aspects, process 400 may include receiving, from a first transmitting UE, a first transmission on a first resource, wherein the first transmission includes information associated with reserving a second resource for a second transmission by the first transmitting UE (block 410). For example, the UE (e.g., using antenna 252, DEMOD 254, MIMO detector 256, receive processor 258, controller/processor 280, and/or the like) may receive, from a first transmitting UE, a first transmission on a first resource, wherein the first transmission includes information associated with reserving a second resource for a second transmission by the first transmitting UE, as described in more detail above.

As shown in FIG. 4, in some aspects, process 400 may include transmitting, for reception by one or more second transmitting UEs and before an occurrence of the second resource, a message associated with indicating that the second resource is reserved for the second transmission by the first transmitting UE (block 420). For example, the UE (e.g., using controller/processor 280, transmit processor 264, TX MIMO processor 266, MOD 254, antenna 252, and/or the like) may transmit, for reception by one or more second transmitting UEs and before an occurrence of the second resource, a message associated with indicating that the second resource is reserved for the second transmission by the first transmitting UE, as described in more detail above.

As shown in FIG. 4, in some aspects, process 400 may include receiving, using the second resource, the second transmission after transmitting the message to indicate that the second resource is reserved for the second transmission (block 430). For example, the UE (e.g., using antenna 252, DEMOD 254, MIMO detector 256, receive processor 258, controller/processor 280, and/or the like) may receive, using the second resource, the second transmission after transmitting the message to indicate that the second resource is reserved for the second transmission, as described in more detail above.

Process 400 may include additional aspects, such as any single aspect and/or any combination of aspects described below and/or in connection with one or more other processes described elsewhere herein.

In a first aspect, the first transmission includes control information and associated data. In a second aspect, alone or in combination with the first aspect, the second transmission is a potential second transmission. In a third aspect, alone or in combination with one or more of the first and second aspects, the UE may selectively receive the second transmission using the second resource. In a fourth aspect, alone or in combination with one or more of the first through third aspects, the message is at least one of: a hybrid automatic repeat request (HARQ) acknowledgement (ACK) message, a HARQ negative-acknowledgement (NACK) message, or a channel quality indicator (CQI) message.

In a fifth aspect, alone or in combination with one or more of the first through fourth aspects, the message includes information identifying a priority associated with the second transmission. In a sixth aspect, alone or in combination with one or more of the first through fifth aspects, a transmit power of the message is selected based at least in part on a reference signal received power (RSRP) of the first transmission. In a seventh aspect, alone or in combination with one or more of the first through sixth aspects, a transmit power of the message is selected based at least in part on a modulation and coding scheme (MCS) or a priority of at least one of the first transmission or the second transmission. In an eighth aspect, alone or in combination with one or more of the first through seventh aspects, the first resource is a feedback channel resource. In a ninth aspect, alone or in combination with one or more of the first through eighth aspects, the message is a feedback message.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
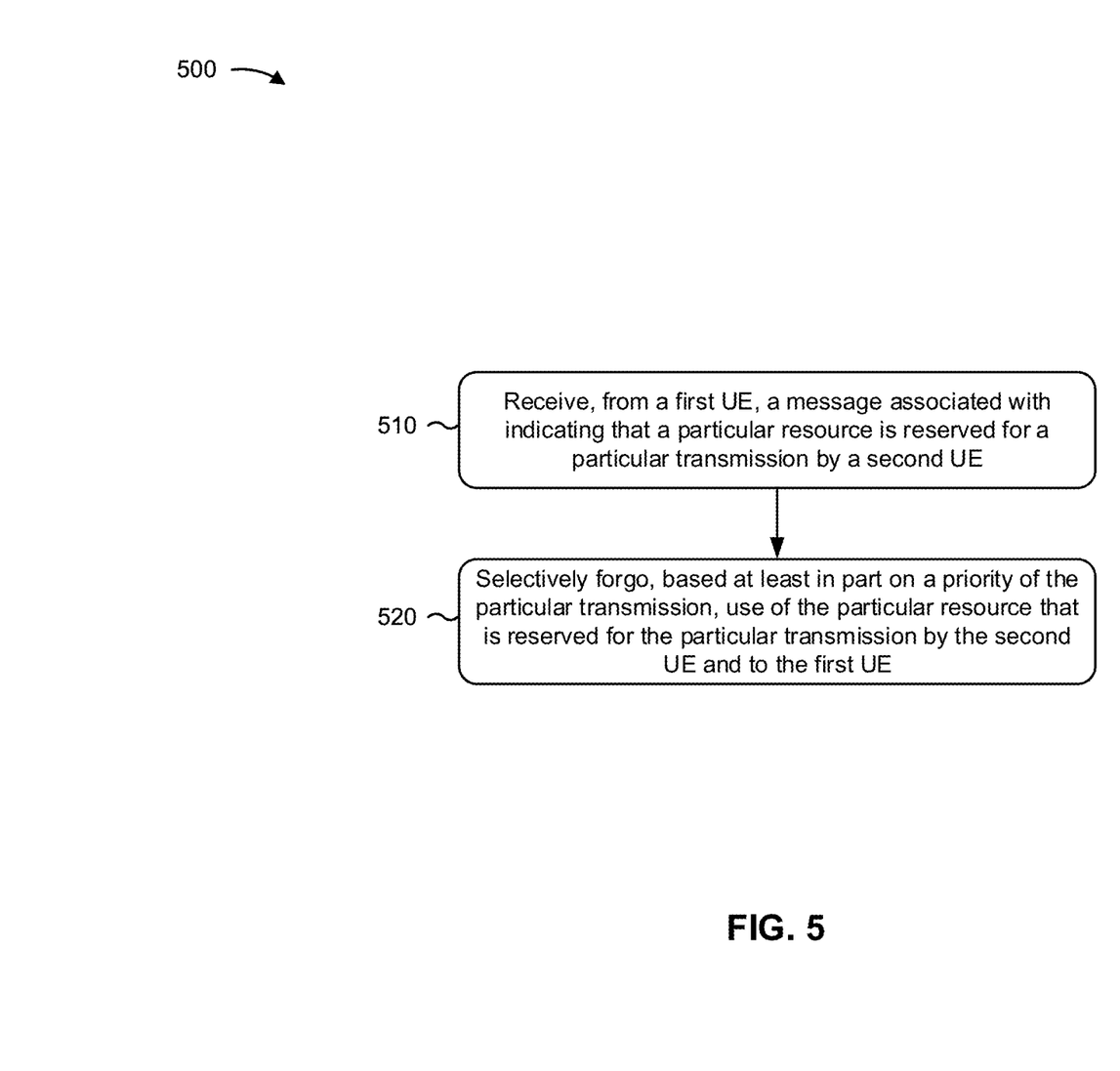
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs receiver-based resource reservation.

As shown in FIG. 5, in some aspects, process 500 may include receiving, from a first UE, a message associated with indicating that a particular resource is reserved for a particular transmission by a second UE (block 510). For example, the UE (e.g., using antenna 252, DEMOD 254, MIMO detector 256, receive processor 258, controller/processor 280, and/or the like) may receive, from a first UE, a message associated with indicating that a particular resource is reserved for a particular transmission by a second UE, as described in more detail above.

As shown in FIG. 5, in some aspects, process 500 may include selectively forgoing, based at least in part on a priority of the particular transmission, use of the particular resource that is reserved for the particular transmission by the second UE and to the first UE (block 520). For example, the UE (e.g., using controller/processor 280, transmit processor 264, TX MIMO processor 266, MOD 254, antenna 252, and/or the like) may selectively forgo, based at least in part on a priority of the particular transmission, use of the particular resource that is reserved for the particular transmission by the second UE and to the first UE, as described in more detail above.

Process 500 may include additional aspects, such as any single aspect and/or any combination of aspects described below and/or in connection with one or more other processes described elsewhere herein.

In a first aspect, the UE may yield a transmission using the particular resource based at least in part on the priority of the particular transmission. In a second aspect, alone or in combination with the first aspect, the UE may drop a transmission on the particular resource. In a third aspect, alone or in combination with one or more of the first and second aspects, the UE may alter a transmit power for a transmission on the particular resource. In a fourth aspect, alone or in combination with one or more of the first through third aspects, the transmit power is selected based at least in part on a reference signal received power (RSRP) indication or a transmit power indication from the first UE. In a fifth aspect, alone or in combination with one or more of the first through fourth aspects, the UE may transmit a higher priority transmission than the particular transmission using the particular resource.

In a sixth aspect, alone or in combination with one or more of the first through fifth aspects, the UE may select a first resource for a first control transmission and data transmission based at least in part on the particular resource and a second resource for a second control transmission and data transmission based at least in part on the particular resource, transmit, using the first resource, the first control transmission and data transmission with information to indicate the second resource and to reserve the second resource, and selectively transmit, using the second resource, the second control transmission and data transmission. In a seventh aspect, alone or in combination with one or more of the first through sixth aspects, the UE may exclude resource reservations by one or more transmitting UEs and one or more receiving UEs from available resources for selection, and may select the first resource and the second resource based at least in part on excluding the resource reservations. In an eighth aspect, alone or in combination with one or more of the first through seventh aspects, the message is received from the UE via another UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a first transmitting UE, a first transmission on a first resource, wherein the first transmission includes information associated with reserving a second resource for a second transmission by the first transmitting UE; and
   transmitting, for reception by one or more second transmitting UEs and before an occurrence of the second transmission, a message associated with indicating that the second resource is reserved for the second transmission by the first transmitting UE,
   wherein the message is at least one of:
      a hybrid automatic repeat request (HARQ) acknowledgement (ACK) message,
      a HARQ negative-acknowledgement (NACK) message, or
      a channel quality indicator (CQI) message.

2. The method of claim 1, wherein the information associated with reserving the second resource is included in control information of the first transmission.

3. The method of claim 1, wherein the message includes at least one of:
   control information and data, or
   priority information associated with the second transmission.

4. The method of claim 1, wherein the first transmission includes control information and associated data.

5. The method of claim 1, wherein the second transmission is a potential retransmission of the first transmission.

6. The method of claim 1, further comprising:
   selectively receiving the second transmission using the second resource.

7. The method of claim 1, wherein a transmit power of the message is selected based at least in part on at least one of:
   a reference signal received power (RSRP) of the first transmission,
   a modulation and coding scheme (MCS), or
   a priority of at least one of the first transmission or the second transmission.

8. The method of claim 1, wherein the first transmitting UE is associated with a first transmission range that includes the UE, and wherein the one or more second transmitting UEs are associated with a second transmission range that includes the UE and not the first transmitting UE.

9. The method of claim 1, wherein the message includes information identifying a priority associated with the second transmission.

10. A user equipment (UE) for wireless communication, comprising:
    a memory; and
    one or more processors coupled to the memory, the one or more processors configured to:
       receive, from a first transmitting UE, a first transmission on a first resource, wherein the first transmission includes information associated with reserving a second resource for a second transmission by the first transmitting UE; and
       transmit, for reception by one or more second transmitting UEs and before an occurrence of the second transmission, a message associated with indicating that the second resource is reserved for the second transmission by the first transmitting UE,
       wherein the message is at least one of:
          a hybrid automatic repeat request (HARQ) acknowledgement (ACK) message,
          a HARQ negative-acknowledgement (NACK) message, or
          a channel quality indicator (CQI) message.

11. The UE of claim 10, wherein the information associated with reserving the second resource is included in control information of the first transmission.

12. The UE of claim 10, wherein the message includes at least one of:
control information and data, or
priority information associated with the second transmission.

13. The UE of claim 10, wherein the first transmission includes control information and associated data.

14. The UE of claim 10, wherein the second transmission is a potential retransmission of the first transmission.

15. The UE of claim 10, wherein the one or more processors are further configured to:
selectively receive the second transmission using the second resource.

16. The UE of claim 10, wherein the first transmitting UE is associated with a first transmission range that includes the UE, and wherein the one or more second transmitting UEs are associated with a second transmission range that includes the UE and not the first transmitting UE.

17. The UE of claim 10, wherein a transmit power of the message is selected based at least in part on at least one of:
a reference signal received power (RSRP) of the first transmission,
a modulation and coding scheme (MCS), or
a priority of at least one of the first transmission or the second transmission.

18. The UE of claim 10, wherein the message includes information identifying a priority associated with the second transmission.

19. A non-transitory computer-readable medium storing a set of instructions for wireless communication, the set of instructions comprising:
one or more instructions that, when executed by one or more processors of a user equipment (UE), cause the UE to:
receive, from a first transmitting UE, a first transmission on a first resource, wherein the first transmission includes information associated with reserving a second resource for a second transmission by the first transmitting UE; and
transmit, for reception by one or more second transmitting UEs and before an occurrence of the second transmission, a message associated with indicating that the second resource is reserved for the second transmission by the first transmitting UE,
wherein the message is at least one of:
a hybrid automatic repeat request (HARQ) acknowledgement (ACK) message,
a HARQ negative-acknowledgement (NACK) message, or
a channel quality indicator (CQI) message.

20. The non-transitory computer-readable medium of claim 19, wherein the first transmitting UE is associated with a first transmission range that includes the UE, and wherein the one or more second transmitting UEs are associated with a second transmission range that includes the UE and not the first transmitting UE.

21. The non-transitory computer-readable medium of claim 19, wherein the information associated with reserving the second resource is included in control information of the first transmission.

22. The non-transitory computer-readable medium of claim 19, wherein the message includes at least one of:
control information and data, or
priority information associated with the second transmission.

23. The non-transitory computer-readable medium of claim 19, wherein the first transmission includes control information and associated data.

24. The non-transitory computer-readable medium of claim 19, wherein the one or more instructions, when executed by the one or more processors of the UE, further cause the UE to:
selectively receive the second transmission using the second resource.

25. The non-transitory computer-readable medium of claim 19, wherein a transmit power of the message is selected based at least in part on at least one of:
a reference signal received power (RSRP) of the first transmission,
a modulation and coding scheme (MCS), or
a priority of at least one of the first transmission or the second transmission.

26. The non-transitory computer-readable medium of claim 19, wherein the message includes information identifying a priority associated with the second transmission.

27. An apparatus for wireless communication, comprising:
means for receiving, from a first transmitting UE, a first transmission on a first resource, wherein the first transmission includes information associated with reserving a second resource for a second transmission by the first transmitting UE; and
means for transmitting, for reception by one or more second transmitting UEs and before an occurrence of the second transmission, a message associated with indicating that the second resource is reserved for the second transmission by the first transmitting UE,
wherein the message is at least one of:
a hybrid automatic repeat request (HARQ) acknowledgement (ACK) message,
a HARQ negative-acknowledgement (NACK) message, or
a channel quality indicator (CQI) message.

28. The apparatus of claim 27, wherein the first transmitting UE is associated with a first transmission range that includes the UE, and wherein the one or more second transmitting UEs are associated with a second transmission range that includes the UE and not the first transmitting UE.

29. The apparatus of claim 27, wherein the information associated with reserving the second resource is included in control information of the first transmission.

30. The apparatus of claim 27, wherein the message includes at least one of: control information and data, or priority information associated with the second transmission.

31. The apparatus of claim 27, further comprising:
means for controlling information and associated data.

32. The apparatus of claim 27, further comprising:
means for selectively receiving the second transmission using the second resource.

33. The apparatus of claim 27, wherein a transmit power of the message is selected based at least in part on at least one of:
a reference signal received power (RSRP) of the first transmission,
a modulation and coding scheme (MCS), or
a priority of at least one of the first transmission or the second transmission.

34. The apparatus of claim 27, wherein the message includes information identifying a priority associated with the second transmission.

\* \* \* \* \*